United States Patent Office 2,764,653
Patented Sept. 25, 1956

2,764,653

ELECTROLYTE FOR AN ELECTROLYTIC SWITCH

John F. Schoeppel, Stuart L. Varner, and Frederick W. Herr, Grand Rapids, Mich., assignors to Lear, Incorporated, Grand Rapids, Mich., a corporation of Illinois No Drawing. Application February 16, 1952,
Serial No. 271,976

8 Claims. (Cl. 200—152)

This invention relates to improvements in liquid level switches and is particularly concerned with the production of markedly improved electrolytes for use in such switches.

Liquid level switches of various specific constructions have heretofore been proposed and they find use for a variety of purposes as, for example, in aircraft instruments for controlling the erection of vertical gyroscopes. Typical examples of such switches are shown, for instance, in U. S. Patents Nos. 2,367,465; 2,376,377; and 2,387,313. In general, they comprise a closed receptacle containing a liquid electrolyte and electrodes having a surface adapted to contact said electrolyte to provide a current-conducting path between said electrolyte and said electrodes. An air bubble within said receptacle shifts about, upon tilting of the switch, to expose more or less of the electrode surface or surfaces whereby the opening and closing of electrical circuits is controlled. The present invention is not concerned with any specific constructions of liquid level switches. Rather, it relates to new and useful electrolytes for use in such switches whereby the operation of such switches is markedly improved.

A fully satisfactory electrolyte for use in liquid level switches must satisfy a number of rigid and exacting criteria. Not only must it have good conductivity over a wide range of temperatures both above and below 0 degrees C. but it must also have long life and stability under the various conditions under which it is used. In addition, it must possess the characteristics of providing a nearly completely reversible reaction, it must not become too viscous under conditions of low temperature, it must be substantially inert to the electrodes and other switch materials with which it comes into contact, and it must not exhibit material physical instability due to thermal effects in the switch. These and other desirable characteristics for a fully satisfactory liquid level switch electrolyte have been appreciated by others but, so far, although various compositions have been suggested and used, there has been much left to be desired in the achievement of an ideal electrolyte.

The electrolytes which are made in accordance with the present invention represent a distinct improvement in at least most of the characteristics which are desired in such products over anything which, so far as is known, have heretofore been suggested or utilized. In general, the electrolytes comprise solutions, in ketones, of sodium iodide and iodine. The ketones can be chosen from the aromatic, aromatic-aliphatic, aromatic-cycloaliphatic, cycloaliphatic, and aliphatic groups, it being particularly desirable to utilize the aliphatic ketones. Illustrative examples of such ketones are benzyl ketone, naphthyl ketone, benzyl ethyl ketone, cyclohexyl benzyl ketone, cyclohexyl isopropyl ketone, methyl isobutyl ketone, methyl amyl ketone, methyl ethyl ketone, diethyl ketone, methyl n-propyl ketone, n-amyl ketone, n-hexyl ketone, n-heptyl ketone, diisopropylketone, diisobutylketone, and the like, as well as mixtures of any two or more thereof. Of particular utility are diisopropylketone and diisobutylketone and preferably mixtures thereof in which the ratio thereof, by volume, is from about 1 to 3 to about 3 to 1 and, more especially, from about 2 to 3 to about 3 to 2.

The proportions of the ingredients of the electrolyte can be varied, within reasonable limits, depending upon the particular results desired. In all cases, of course, the electrolyte is in liquid form and comprises a solution, in a ketone or mixture of ketones, of sodium iodide and iodine. In general, in each 100 ml. of electrolyte solution there should be present from about 3 to about 10 grams of sodium iodide and from about 8 to about 16 grams of iodine. A particularly preferred range of proportions comprises from about 4 to about 6 grams of sodium iodide and from about 10 to about 14 grams of iodine in each 100 ml. of electrolyte solution. It will be understood that, in general, an increase in the concentration of the sodium iodide will, up to a certain point depending upon its solubility in the particular ketone or mixture of ketones utilized and depending upon the concentration of iodine, result in an increase in electrical conductivity of the electrolyte solution. However, the concentration of the sodium iodide should not be increased beyond the point where the stability of the liquid level switch is affected and where, at low temperatures under which the liquid level switch may be required to function, the sodium iodide may crystallize or separate out of the electrolyte solution. In the case of the iodine, an increase in its concentration up to a certain point will, in general, increase the conductivity of the electrolyte solution. Beyond that point, a further increase in the iodine concentration tends, in general, to have little effect at room temperatures and, in at least certain cases, the electrical conductivity is decreased at low temperatures as, for example, temperatures of the order of −50 to −55 degrees C. The ratio of the sodium iodide to iodine in the electrolyte solution is quite variable. Excellent results, for example, are obtained with ratios of sodium iodide to iodine of 1 to 2, of 3 to 5, and with ratios of 1 to 6 and even higher.

The following examples are illustrative of electrolytes falling within the scope of the invention. It will be understood that such examples are in no way limitative of the invention since numerous other electrolyte compositions can readily be prepared in the light of the guiding principles and teachings disclosed herein. Thus, for example, other ketones and mixtures of various ketones can be utilized, and the proportions of the ingredients can be varied, within reasonable limits, as desired. The stated quantities of sodium iodide and iodine represent the number of grams of each in 100 ml. of the electrolyte solution made by dissolving the sodium iodide and the iodine in the stated ketone or mixture of ketones.

| Example | Ketone | Sodium Iodide | Iodine |
|---|---|---|---|
| 1 | Methyl n-propyl ketone | 0.5 | 6 |
| 2 | do | 1 | 22 |
| 3 | Diisopropylketone | 3 | 8 |
| 4 | do | 6 | 10 |
| 5 | Diisobutylketone | 4 | 8 |
| 6 | do | 5 | 11 |
| 7 | Diisopropylketone Diisobutylketone, equal parts. | 5 | 12 |

For best results, certain precautions should be exercised in carrying out the preparation of the electrolyte solution. The sodium iodide should be C. P. and anhydrous and the iodine should be C. P. and resublimed. The ketones may be pure or of practical grade. The materials should be so handled as to insure against contamination and to protect the same against moisture. To these ends, the sodium iodide and the iodine should be stored, prior to use, in closed containers in a desiccator or the like and, when handled, as for weighing or the like, should be placed on glass or the like to avoid any possible metallic contamination. The finished liquid electrolyte, where stored, should be kept in sealed glass or the like containers and, if the latter are stored in air, it is advantageous that the dew point of the air does not exceed about −55 degrees F. To facilitate the maintenance of the precautions described above, it is, in general, advisable to work with small batches of the materials.

In preparing the electrolyte solutions, a good operating technique comprises, for example, in an illustrative case, placing 2.5 grams of sodium iodide in an open, small mouth container of about 60 ml. capacity which previously has been cleaned and dried and which can easily be sealed. The container and its contents of sodium iodide is then placed in a vacuum heating chamber and evacuated to about 25 inches of mercury and heated to approximately 150 degrees F. for about 30 minutes. Promptly upon removal of the container from the vacuum chamber, 6 grams of iodine crystals are placed in said container, and then 25 ml. of diisopropylketone and 25 ml. diisobutylketone are added to the container and the ingredients are thoroughly mixed to effect solution of the sodium iodide and iodine. The container is then sealed until the electrolyte solution is ready to be used.

In use, the interior of the liquid level switch casing is thoroughly washed with a ketone, for example, diisobutylketone, using several rinses. The switches are placed in a vacuum heating chamber, evacuated to about 25 inches of mercury, and heated to about 150 degrees F. for about 30 minutes. The switch assembly is placed in a suitable leveling fixture and the liquid electrolyte is introduced into the switch casing to the desired level by means of a hypodermic syringe or the like and the casing is then closed. The usual techniques in filling, sealing and testing the finished switches are employed.

While the invention has been described in detail, it will be understood that various modifications may be made without departing from the essential teachings set forth herein and which are delineated in the appended claims.

What is claimed and desired to be protected by Letters Patent of the United States is:

1. In a liquid level switch which includes a closed receptacle containing an electrolyte and electrodes having a surface adapted to contact said electrolyte to provide a current-conducting path between said electrolyte and said electrodes, the improvement wherein said electrolyte consists essentially of a solution, in a ketone, of sodium iodide and iodine, the iodine being present in amount greater than the amount of the sodium iodide.

2. A liquid level switch in accordance with claim 1, wherein said ketone is an aliphatic ketone.

3. A liquid level switch in accordance with claim 2, wherein the sodium iodide is present in proportions ranging from about 3 to about 10 grams per 100 ml. of said electrolyte solution, and the iodine is present in proportions ranging from about 8 to about 16 grams per 100 ml. of said electrolyte solution.

4. A liquid level switch in accordance with claim 2, wherein the sodium iodide is present in proportions ranging from about 4 to about 6 grams per 100 ml. of said electrolyte solution, and the iodine is present in proportions ranging from about 10 to about 14 grams per 100 ml. of said electrolyte solution.

5. In a liquid level switch which includes a closed receptacle containing an electrolyte and electrodes having a surface adapted to contact said electrolyte to provide a current-conducting path between said electrolyte and said electrodes, the improvement wherein said electrolyte consists essentially of a solution, in a ketone, of sodium iodide and iodine, the sodium iodide being present in proportions ranging from about 4 to about 6 grams per 100 ml. of said electrolyte solution, and said iodine being present in proportions ranging from about 10 to about 14 grams per 100 ml. of said electrolyte solution.

6. A liquid level switch in accordance with claim 5, wherein said ketone comprises at least one member selected from the group consisting of diisopropyl ketone and diisobutylketone.

7. A liquid level switch in accordance with claim 5, wherein said ketone comprises a mixture of diisopropylketone and dissobutylketone in which the ratio of said ketones to each other by volume is from about 1 to 3 to about 3 to 1.

8. In a liquid level switch which includes a closed receptacle containing an electrolyte and electrodes having a surface adapted to contact said electrolyte to provide a current-conducting path between said electrolyte and said electrodes, the improvement wherein said electrolyte consists essentially of a solution, in a ketone, of sodium iodide and iodine, said electrolyte containing the following ingredients in the stated amounts relative to each other:

| | |
|---|---|
| Diisopropylketone _____ml__ | 50 |
| Diisobutylketone _____ml__ | 50 |
| Sodium iodide_____grams__ | 5 |
| Iodine_____do____ | 12 |

References Cited in the file of this patent

UNITED STATES PATENTS

| | | |
|---|---|---|
| 2,036,669 | Yngve | Apr. 7, 1936 |
| 2,250,212 | Suits | July 22, 1941 |
| 2,387,313 | Wilson | Oct. 23, 1945 |

OTHER REFERENCES

Krause: "The Properties of Electrically Conducting Systems," pp. 47 pertinent, The Cehm Catalog Co., Inc., New York, (1922).